US012025530B2

(12) United States Patent
Takikawa et al.

(10) Patent No.: US 12,025,530 B2
(45) Date of Patent: Jul. 2, 2024

(54) OPTICAL PULSE TESTER

(71) Applicants: Yokogawa Electric Corporation, Tokyo (JP); Yokogawa Test & Measurement Corporation, Tokyo (JP)

(72) Inventors: Akira Takikawa, Hachioji (JP); Shoichi Aoki, Hachioji (JP); Katsushi Ota, Hachioji (JP); Haruyoshi Uchiyama, Hachioji (JP)

(73) Assignees: Yokogawa Electric Corporation, Tokyo (JP); Yokogawa Test & Measurement Corporation, Tokyo (JP)

( * ) Notice: Subject to any disclaimer, the term of this patent is extended or adjusted under 35 U.S.C. 154(b) by 13 days.

(21) Appl. No.: 17/715,586

(22) Filed: Apr. 7, 2022

(65) Prior Publication Data
US 2022/0341813 A1 Oct. 27, 2022

(30) Foreign Application Priority Data
Apr. 22, 2021 (JP) .................. 2021-072645

(51) Int. Cl.
*G01M 11/00* (2006.01)
(52) U.S. Cl.
CPC .... *G01M 11/3145* (2013.01); *G01M 11/3127* (2013.01)
(58) Field of Classification Search
CPC ............. G01M 11/31; G01M 11/3109; G01M 11/3118; G01M 11/3127; G01M 11/3136;
(Continued)

(56) References Cited

U.S. PATENT DOCUMENTS 4,737,026 A * 4/1988 Dalgoutte .......... G01M 11/3127
356/73.1
5,491,548 A * 2/1996 Bell ................... G01M 11/3145
356/73.1
(Continued)

FOREIGN PATENT DOCUMENTS

FR 2817960 A1 * 6/2002 ........ G01M 11/3127
JP 2972973 B2 * 11/1999
(Continued)

*Primary Examiner* — Gordon J Stock, Jr.
(74) *Attorney, Agent, or Firm* — RANKIN, HILL & CLARK LLP

(57) ABSTRACT

An optical pulse tester includes an optical divider configured to cause a return light to divide into first divided light and second divided light, a first optical receiver configured to receive the first divided light and output a first optical receiver signal, a second optical receiver configured to receive the second divided light and output a second optical receiver signal, and a signal processor configured to obtain a waveform indicating an intensity distribution of the return light in a longitudinal direction of the optical fiber by performing level conversion of the first optical receiver signal and the second optical receiver signal on the basis of a divided ratio of the optical divider and optical receiver sensitivities of the first optical receiver and the second optical receiver and synthesizing the first optical receiver signal and the second optical receiver signal which have been subjected to the level conversion.

10 Claims, 3 Drawing Sheets

(58) Field of Classification Search
CPC ......... G01M 11/3145; G01M 11/3154; G01M 11/3172; G01M 11/3181; G01M 11/319; H04B 10/071

See application file for complete search history.

(56) References Cited

U.S. PATENT DOCUMENTS

| | | | | |
|---|---|---|---|---|
| 5,708,500 | A * | 1/1998 | Anderson | G01M 11/3145 356/73.1 |
| 6,771,361 | B2 * | 8/2004 | Araki | G01N 21/412 356/73.1 |
| 6,839,130 | B2 * | 1/2005 | Araki | G01M 11/3127 356/73.1 |
| 7,800,744 | B2 * | 9/2010 | Lai | H04J 14/0282 356/73.1 |
| 8,913,235 | B2 * | 12/2014 | Komamaki | G01M 11/3136 356/73.1 |
| 2005/0117840 | A1 * | 6/2005 | Beller | G01M 11/3127 385/24 |
| 2011/0141457 | A1 * | 6/2011 | Levin | G01M 11/3127 356/73.1 |
| 2014/0078506 | A1 * | 3/2014 | Hu | G01M 11/3118 356/445 |
| 2016/0238483 | A1 * | 8/2016 | Myong | G02B 6/293 |

FOREIGN PATENT DOCUMENTS

| | | | |
|---|---|---|---|
| JP | 2001066221 A | * | 3/2001 |
| JP | 2008-286578 A | | 11/2008 |
| JP | 2011-007618 | | 1/2011 |
| JP | 2011007618 A | * | 1/2011 |
| JP | 2011013136 A | * | 1/2011 |

* cited by examiner

OPTICAL PULSE TESTER

BACKGROUND

Field of the Invention

The present invention relates to an optical pulse tester.

Priority is claimed on Japanese Patent Application No. 2021-072645, filed on Apr. 22, 2021, the contents of which are incorporated herein by reference.

Description of Related Art

An optical pulse tester is a device for testing or measuring characteristics of an optical fiber on the basis of return light obtained from an optical fiber (test object) by causing an optical pulse to be incident on the optical fiber. Regarding an optical pulse tester of this kind, there is an optical time domain reflectometer (OTDR) for measuring a transmission loss of an optical fiber, a distance to a point of failure, or the like on the basis of Rayleigh scattering light or Fresnel reflection light generated inside the optical fiber.

For example, such an OTDR is used for checking the quality of installation construction work at the time of installation of optical fibers serving as communication media of an optical communication system or searching for a point of failure in optical fibers or measuring a loss at the time of maintenance after installation. Japanese Unexamined Patent Application Publication No. 2008-286578 discloses an OTDR in the related art in which an optical receiver sensitivity of an optical receiver for receiving back-scattering light can be set to a desired optical receiver sensitivity regardless of change in ambient temperature.

Incidentally, in an OTDR, an amplification degree of an optical receiver for receiving back-scattering light may be dynamically changed during a test of an optical fiber. For example, when a test of a high reflection point of an optical fiber is performed, since the optical intensity of return light is excessively high, the amplification degree of the optical receiver is reduced. When a test of a point having a large loss in an optical fiber is performed, since the optical intensity of return light is excessively low, the amplification degree of the optical receiver is increased. However, if the amplification degree of the optical receiver is dynamically changed, there is a problem that deterioration in performance of an optical pulse tester may be caused.

SUMMARY

An optical pulse tester is for testing characteristics of an optical fiber on the basis of return light obtained by causing an optical pulse to be incident on the optical fiber. The optical pulse tester may include an optical divider configured to cause the return light to divide into first divided light and second divided light, a first optical receiver configured to receive the first divided light and output a first optical receiver signal, a second optical receiver configured to receive the second divided light and output a second optical receiver signal, and a signal processor configured to obtain a waveform indicating an intensity distribution of the return light in a longitudinal direction of the optical fiber by performing level conversion of the first optical receiver signal and the second optical receiver signal on the basis of a divided ratio of the optical divider and optical receiver sensitivities of the first optical receiver and the second optical receiver and synthesizing the first optical receiver signal and the second optical receiver signal which have been subjected to the level conversion.

Further features and aspects of the present disclosure will become apparent from the following detailed description of exemplary embodiments with reference to the attached drawings.

DESCRIPTION OF EMBODIMENTS

Figure 1:
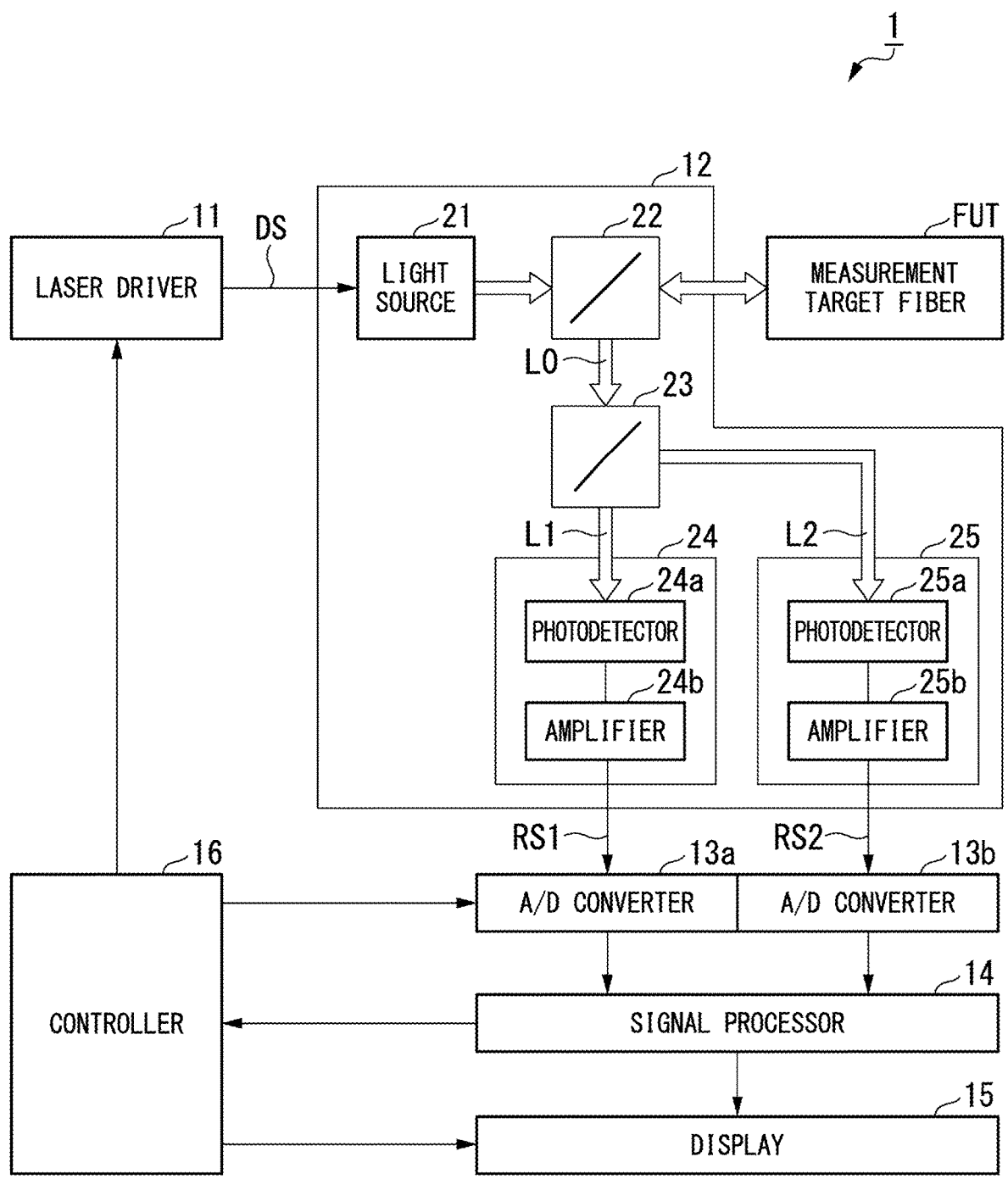
FIG. 1 is a block diagram illustrating main constituents of an optical pulse tester according to an embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a high-performance optical pulse tester in which deterioration in performance as in the related art is not caused when an amplification degree of an optical receiver is dynamically changed.

Hereinafter, an optical pulse tester according to an embodiment of the present invention will be described in detail with reference to the drawings. In the following description, first, an overview of the embodiment of the present invention will be described. Subsequently, details of the embodiment of the present invention will be described.

[Overview]

The embodiment of the present invention provides a high-performance optical pulse tester in which deterioration in performance as in the related art is not caused when an amplification degree of an optical receiver is dynamically changed. Specifically, there is provided a high-performance optical pulse tester in which deterioration in performance as in the related art is not caused by allowing return light obtained from an optical fiber to be appropriately received even if an amplification degree of an optical receiver is not dynamically changed.

In an OTDR, for example, when a test of a high reflection point of an optical fiber is performed, since the optical intensity of return light is excessively high, the amplification degree of the optical receiver is reduced. When a test of a point having a large loss in an optical fiber is performed, since the optical intensity of return light is excessively low, the amplification degree of the optical receiver is increased. In the manner, if the amplification degree of the optical receiver is dynamically changed, deterioration in performance described in the following (1) to (3) is caused.

(1) Delay in Waveform Update

Since an optical fiber is required to be tested every time the amplification degree is changed, an updating interval of an OTDR waveform (a waveform indicating an intensity distribution of return light in a longitudinal direction of an optical fiber) is lengthened. As a result, screen display of the OTDR waveform is delayed.

(2) Waveform Shift of Distance Axis

In a case in which a circuit time constant of the optical receiver varies depending on the amplification degree, if the amplification degree of the optical receiver is dynamically changed, a waveform shift of a distance axis (positional displacement of an OTDR waveform in the longitudinal direction of an optical fiber) occurs. If an amplification degree having minor change in circuit time constant is selected, the waveform shift of a distance axis can be prevented, but selection of the amplification degree is limited.

(3) Degradation of Responsiveness of High Reflection Point

When a test of a high reflection point of an optical fiber is performed, if return light having an excessively high optical intensity is received by the optical receiver, output saturation of an amplifier provided in the optical receiver occurs, and thus a response speed is degraded. As a result, reproducibility of an OTDR waveform in the vicinity of a high reflection point of an optical fiber deteriorates.

In the embodiment of the present invention, return light obtained from an optical fiber is caused to divide into first divided light and second divided light by an optical divider, the first divided light is received by a first optical receiver, and the second divided light is received by a second optical receiver. Subsequently, level conversion of first and second optical receiver signals respectively output from the first and second optical receivers is performed on the basis of a divided ratio of the optical divider and optical receiver sensitivities of the first and second optical receivers. Further, a waveform indicating an intensity distribution of return light in the longitudinal direction of an optical fiber is obtained by synthesizing the first and second optical receiver signals which have been subjected to level conversion.

Accordingly, return light obtained from an optical fiber can be appropriately received even if the amplification degree of the optical receiver is not dynamically changed. As a result, it is possible to provide a high-performance optical pulse tester in which deterioration in performance as in the related art is not caused when the amplification degree of the optical receiver is dynamically changed.

[Details]
<Optical Pulse Tester>

FIG. 1 is a block diagram illustrating main constituents of an optical pulse tester according to the embodiment of the present invention. As illustrated in FIG. 1, an optical pulse tester 1 of the present embodiment includes a laser driver 11, a bidirectional module 12, A/D converters 13a and 13b, a signal processor 14, a display 15, and a controller 16. Such an optical pulse tester 1 performs a test or measurement of characteristics of a measurement target fiber FUT (optical fiber) on the basis of return light L0 obtained by causing an optical pulse to be incident on the measurement target fiber FUT. The optical pulse tester 1 is also referred to as an OTDR. The laser driver 11 outputs a drive signal DS for driving the bidirectional module 12 under control of a controller 16. Namely, the laser driver 11 outputs a drive signal DS for causing an optical pulse incident on the measurement target fiber FUT to be output from the bidirectional module 12. The bidirectional module 12 outputs an optical pulse (laser light) incident on the measurement target fiber FUT on the basis of the drive signal DS output from the laser driver 11 and receives the return light L0 obtained from the measurement target fiber FUT, thereby outputting an optical receiver signal RS1 (first optical receiver signal) and an optical receiver signal RS2 (second optical receiver signal).

The bidirectional module 12 includes a light source 21, an optical directional coupler 22, an optical divider 23, an optical receiver 24 (first optical receiver), and an optical receiver 25 (second optical receiver). For example, the light source 21 includes a semiconductor laser, which emits an optical pulse when the drive signal DS output from the laser driver 11 is input. A wavelength of an optical pulse emitted from the light source 21 may be in a band of 1.31 μm, a band of 1.55 μm, or a band of 1.6 μm, for example.

The optical directional coupler 22 couples an optical pulse emitted from the light source 21 to one end of the measurement target fiber FUT. In addition, the optical directional coupler 22 guides the return light L0 obtained by causing the optical pulse to be incident on the measurement target fiber FUT (the return light L0 emitted from one end of the measurement target fiber FUT) to the optical divider 23. For example, a half mirror can be used as this optical directional coupler 22.

The optical divider 23 causes the return light L0 guided by the optical directional coupler 22 to divide into divided light L1 (first divided light) and divided light L2 (second divided light). The optical divider 23 causes the return light L0 to divide into the divided light L1 and the divided light L2 in different divided ratios (for example, 95:5). The divided ratio of the optical divider 23 can be arbitrarily set. However, for example, it is set in consideration of the optical receiver sensitivities of the optical receivers 24 and 25.

The optical receiver 24 receives the divided light L1 caused to divide by the optical divider 23 and outputs the optical receiver signal RS1. The optical receiver 24 includes a photodetector 24a (first photodetector) and an amplifier 24b (first amplifier). For example, the photodetector 24a includes an avalanche photodiode (APD), which performs photoelectric conversion of the divided light L1 incident on an optical receiver surface and outputs an optical receiver signal. The amplifier 24b amplifies an optical receiver signal output from the photodetector 24a at an amplification rate set in advance and outputs it as the optical receiver signal RS1.

The optical receiver 25 receives the divided light L2 caused to divide by the optical divider 23 and outputs the optical receiver signal RS2. The optical receiver 25 includes a photodetector 25a (second photodetector) and an amplifier 25b (second amplifier). For example, the photodetector 25a includes an avalanche photodiode, which performs photoelectric conversion of the divided light L2 incident on an optical receiver surface and outputs an optical receiver signal. The amplifier 25b amplifies an optical receiver signal output from the photodetector 25a at an amplification rate set in advance and outputs it as the optical receiver signal RS2.

Here, the optical receiver 24 and the optical receiver 25 may have different optical receiver sensitivities or may have the same optical receiver sensitivities. The optical receiver sensitivities of the optical receivers 24 and 25 may be set in accordance with the divided ratio of the optical divider 23. For example, the optical receiver sensitivities of the optical receivers 24 and 25 may differ from each other when the divided ratio of the optical divider 23 is the same, or the optical receiver sensitivities of the optical receivers 24 and 25 may be the same when the divided ratio of the optical divider 23 differ from each other. In the present embodiment, in order to make the description simple, it is assumed that the optical receiver 24 and the optical receiver 25 have the same optical receiver sensitivities.

In addition, the photodetector 24a provided in the optical receiver 24 and the photodetector 25a provided in the optical receiver 25 may have optical receiver characteristics which are the same as or different from each other. For example, the photodetector 24a may have a lower dark current, or the photodetector 25a may have a higher dark current. In addition, the amplifier 24b provided in the optical receiver 24 and the amplifier 25b provided in the optical receiver 25 may have amplification rates which are the same as or different from each other.

The divided ratio of the optical divider 23, the optical receiver sensitivity of the optical receiver 24 (characteristics of the photodetector 24a and the amplification rate of the amplifier 24b), and the optical receiver sensitivity of the optical receiver 25 (characteristics of the photodetector 25a and the amplification rate of the amplifier 25b) can be arbitrarily set in accordance with performance of the optical pulse tester 1. These pieces of information are stored in the signal processor 14 in advance. A specific constitution of the bidirectional module 12 will be described below.

The A/D converter 13a samples the optical receiver signal RS1 output from the bidirectional module 12 (optical receiver 24) under control of the controller 16. The A/D converter 13b samples the optical receiver signal RS2 output from the bidirectional module 12 (optical receiver 25) under control of the controller 16.

The signal processor 14 performs computation required to obtain characteristics of the measurement target fiber FUT using signals sampled by the A/D converters 13a and 13b. Specifically, the signal processor 14 performs level conversion of signals sampled by the A/D converters 13a and 13b on the basis of the divided ratio of the optical divider 23 and the optical receiver sensitivities of the optical receivers 24 and 25. In addition, the signal processor 14 obtains an OTDR waveform (a waveform indicating an intensity distribution of the return light L0 in the longitudinal direction of the measurement target fiber FUT) by synthesizing signals subjected to level conversion.

For example, the display 15 includes a display device such as a liquid crystal display device, which displays computation results and the like of the signal processor 14. For example, computation results of the signal processor 14 may be output to the outside as a data file. The controller 16 generally manages and controls operation of the optical pulse tester 1. For example, the controller 16 controls the laser driver 11 such that the drive signal DS is output from the laser driver 11, controls the A/D converters 13a and 13b such that the optical receiver signals RS1 and RS2 are sampled, and causes the display 15 to perform display such that a state of the optical pulse tester 1 is displayed.

<Bidirectional Module>

Figure 2:
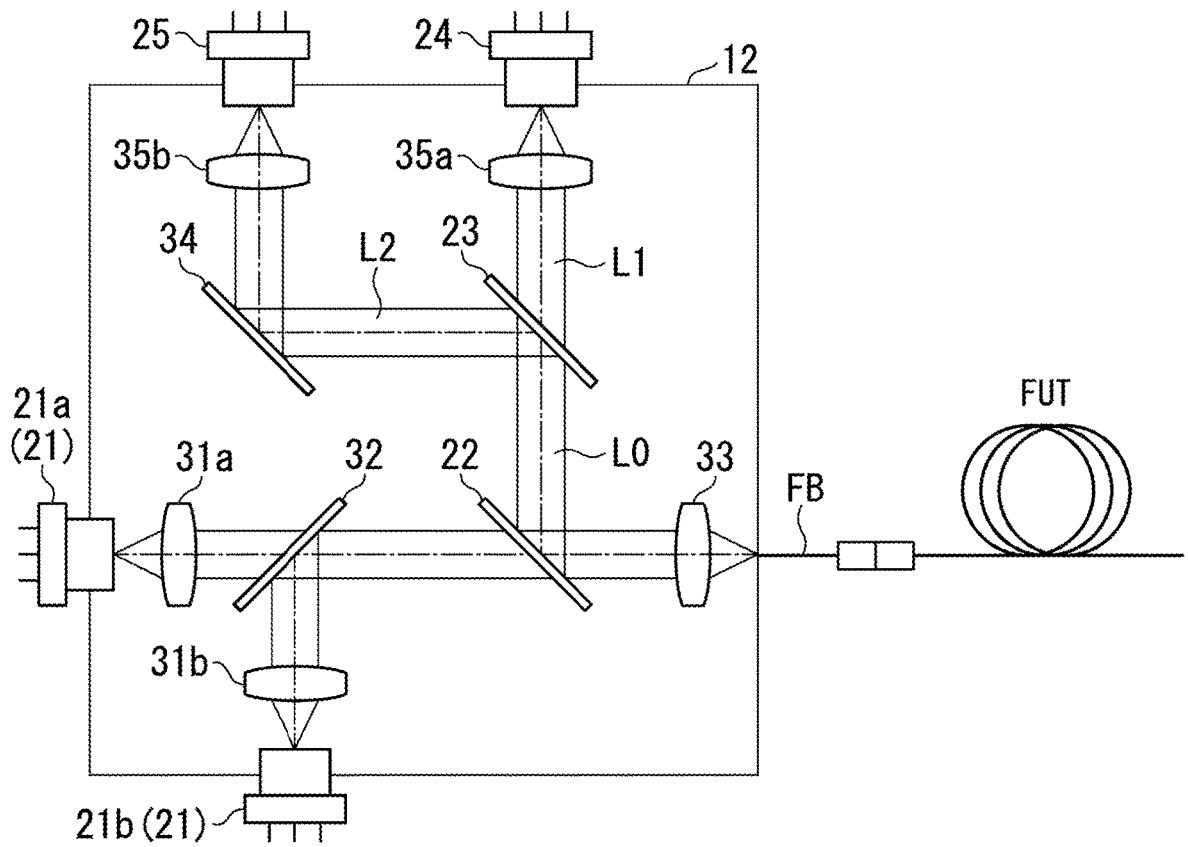
FIG. 2 is a view illustrating a specific constitution of a bidirectional module according to the embodiment of the present invention.

FIG. 2 is a view illustrating a specific constitution of a bidirectional module according to the embodiment of the present invention. In FIG. 2, the same reference signs are applied to constituents corresponding to the constituents illustrated in FIG. 1. As illustrated in FIG. 2, the bidirectional module 12 according to the present embodiment includes collimating lenses 31a and 31b, a multiplexing filter 32, a condensing lens 33, a total reflection mirror 34, and condensing lenses 35a and 35b, in addition to the light source 21, the optical directional coupler 22, the optical divider 23, the optical receiver 24, and the optical receiver 25 illustrated in FIG. 1.

The bidirectional module 12 illustrated in FIG. 2 includes two light sources 21a and 21b as the light source 21 illustrated in FIG. 1. The light source 21a emits an optical pulse having a wavelength λ1 (which may hereinafter be referred to as "a first optical pulse") when the drive signal DS output from the laser driver 11 illustrated in FIG. 1 is input. The light source 21b emits an optical pulse having a wavelength θ2 (which may hereinafter be referred to as "a second optical pulse") when the drive signal DS output from the laser driver 11 illustrated in FIG. 1 is input. The wavelength θ1 is in a band of 1.31 μm, for example, and the wavelength λ2 is in a band of 1.55 μm, for example. The wavelength λ2 may be in a band of 1.6 μm, for example.

The collimating lens 31a converts the first optical pulse emitted from the light source 21a into Collimated beam, and the collimating lens 31b converts the second optical pulse emitted from the light source 21b into Collimated beam. The multiplexing filter 32 multiplexes the first optical pulse and the second optical pulse which have been converted into Collimated beam by the collimating lenses 31a and 31b. Here, for instance, when the light sources 21a and 21b are driven at the same time, the first optical pulse and the second optical pulse are multiplexed by the multiplexing filter 32. When any one of the light sources 21a and 21b is driven, any one of the first optical pulse and the second optical pulse is guided to the optical directional coupler 22 via the multiplexing filter 32. For example, regarding this multiplexing filter 32, a dichroic mirror or a half mirror allowing the first optical pulse to be transmitted therethrough and reflecting the second optical pulse can be used.

The condensing lens 33 couples an optical pulse transmitted through the optical directional coupler 22 to one end of a coupling optical fiber FB. One end of the coupling optical fiber FB is connected to the bidirectional module 12 and is optically coupled to the condensing lens 33, and the other end thereof is connected to one end of the measurement target fiber FUT. In addition, the condensing lens 33 converts the return light L0 obtained from the measurement target fiber FUT into Collimated beam and guides it to the optical directional coupler 22.

The total reflection mirror 34 reflects the divided light L2 caused to divide by the optical divider 23 toward the condensing lens 35b. The condensing lens 35a couples the divided light L1 caused to divide by the optical divider 23 to the optical receiver surface of the optical receiver 24. The condensing lens 35b couples the divided light L2 reflected by the total reflection mirror 34 to the optical receiver surface of the optical receiver 25.

<Operation of Optical Pulse Tester>

When operation of the optical pulse tester 1 starts, first, the laser driver 11 is controlled by the controller 16 illustrated in FIG. 1, and the drive signal DS is output from the laser driver 11. The drive signal DS output from the laser driver 11 is supplied to any one of the light sources 21a and 21b of the bidirectional module 12. When a test of the measurement target fiber FUT using the first optical pulse is performed, the drive signal DS is supplied to the light source 21a, and when a test of the measurement target fiber FUT using the second optical pulse is performed, the drive signal DS is supplied to the light source 21b. Here, it is assumed that the drive signal DS is supplied to the light source 21a. If the drive signal DS is supplied, the first optical pulse is emitted from the light source 21a.

The first optical pulse emitted from the light source 21a is converted into Collimated beam by the collimating lens 31a, goes through the multiplexing filter 32, the optical directional coupler 22, the condensing lens 33, and the coupling optical fiber FB in this order, and is then incident on the measurement target fiber FUT. As an optical pulse is propagated through the measurement target fiber FUT, Rayleigh scattering light or Fresnel reflection light is generated inside the measurement target fiber FUT. These are propagated as return light through the measurement target fiber FUT in the opposite direction (a direction opposite to a propagation direction of an optical pulse).

The return light L0 output from the measurement target fiber FUT is reflected by the optical directional coupler 22 and is incident on the optical divider 23 after going through the coupling optical fiber FB and the condensing lens 33 in this order. In the return light L0 incident on the optical divider 23, a part thereof transmitted through the optical divider 23 is caused to divide into the divided light L1, and a part thereof reflected by the optical divider 23 is caused to divide into the divided light L2.

The divided light L1 is condensed by the condensing lens 35a and is then received by the optical receiver 24. Accordingly, the optical receiver signal RS1 is output from the optical receiver 24. In contrast, the divided light L2 is reflected by the total reflection mirror 34, is condensed by the condensing lens 35b, and is then received by the optical receiver 25. Accordingly, the optical receiver signal RS2 is output from the optical receiver 25. Reception of the divided light L1 by the optical receiver 24 and reception of the divided light L2 by the optical receiver 25 are performed at the same time.

The optical receiver signal RS1 output from the optical receiver 24 is input to the signal processor 14 after being sampled by the A/D converter 13a, and the optical receiver signal RS2 output from the optical receiver 25 is input to the signal processor 14 after being sampled by the A/D converter 13b. In the signal processor 14, computation required to obtain characteristics of the measurement target fiber FUT is performed using signals sampled by the A/D converters 13a and 13b. Specifically, the signal processor 14 performs processing in which level conversion of signals sampled by the A/D converters 13a and 13b is performed on the basis of the divided ratio of the optical divider 23 and the optical receiver sensitivities of the optical receivers 24 and 25, and an OTDR waveform is obtained by synthesizing signals subjected to level conversion.

Figure 3A:
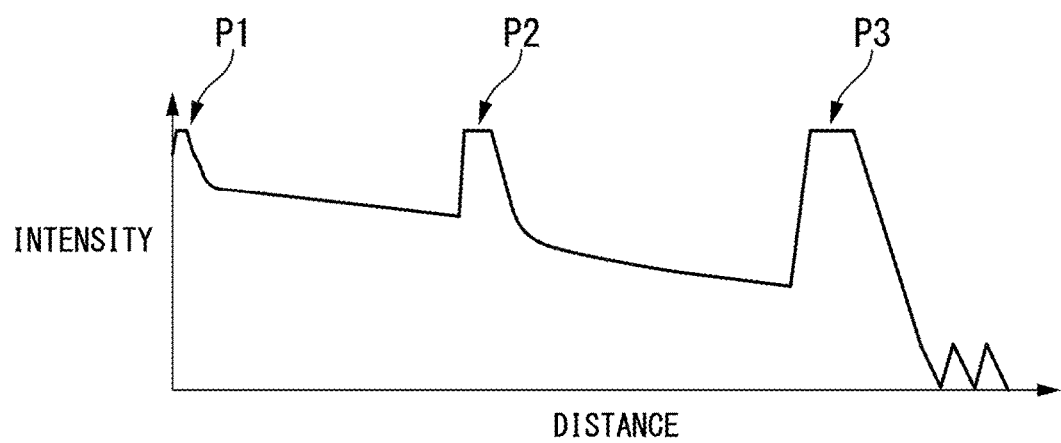
FIG. 3A to 3C are explanatory views of processing performed by a signal processor according to the embodiment of the present invention.
Figure 3B:
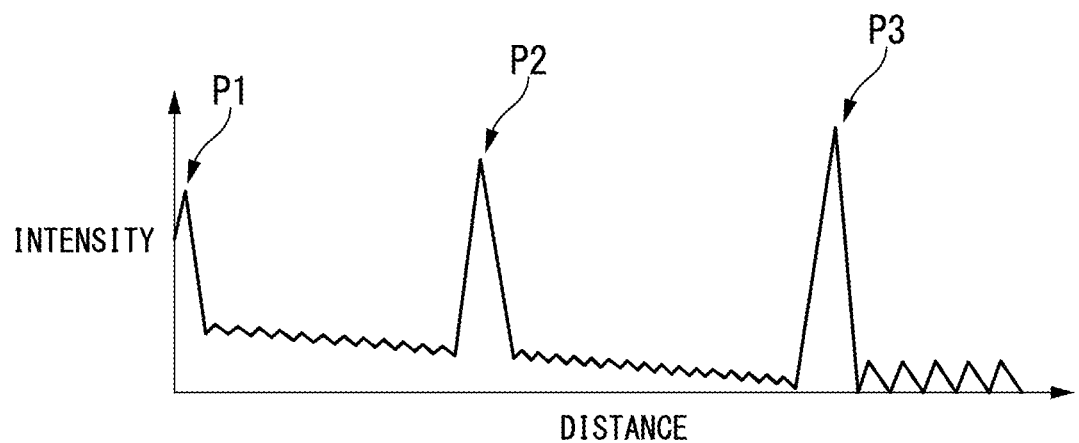
Figure 3C:
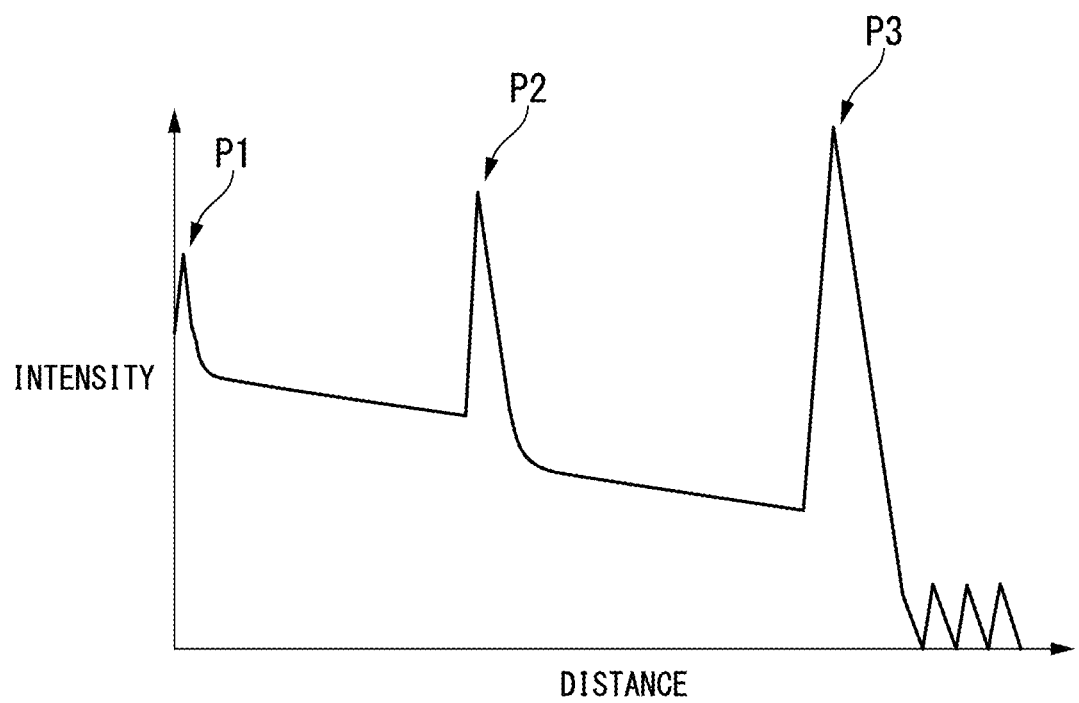

FIG. 3 is an explanatory view of processing performed by a signal processor in the embodiment of the present invention. FIG. 3A is a view illustrating an OTDR waveform obtained from the optical receiver signal RS1 output from the optical receiver 24, and FIG. 3B is a view illustrating an OTDR waveform obtained from the optical receiver signal RS2 output from the optical receiver 25. In addition, FIG. 3C is a view illustrating an OTDR waveform obtained when processing of the signal processor 14 is performed. In the graphs illustrated in FIGS. 3A to 3C, the horizontal axis indicates the distance from one end (an end on which an optical pulse is incident) of the measurement target fiber FUT, and the vertical axis indicates the signal intensity.

The optical receiver signal RS1 is obtained by the optical receiver 24 receiving the divided light L1 which has been caused to divide by the optical divider 23 in a large divided ratio. For this reason, in the OTDR waveform illustrated in FIG. 3A, the signal level is high in its entirety, and peak parts P1 to P3 are saturated. In contrast, the optical receiver signal RS2 is obtained by the optical receiver 25 receiving the divided light L2 which has been caused to divide by the optical divider 23 in a small divided ratio. For this reason, in the OTDR waveform illustrated in FIG. 3B, the signal level is low in its entirety, and the peak parts P1 to P3 are correctly manifested without being saturated.

As described above, in the present embodiment, in order to make the description simple, it is assumed that the optical receiver 24 and the optical receiver 25 have the same optical receiver sensitivities. For this reason, in the signal processor 14, for example, conversion of increasing the level of the OTDR waveform illustrated in FIG. 3B by an amount corresponding to the divided ratio of the optical divider 23 is performed, and conversion of reducing the level of the OTDR waveform illustrated in FIG. 3C by an amount corresponding to the divided ratio of the optical divider 23 is performed. if an OTDR waveform subjected to such level conversion is synthesized, the OTDR waveform illustrated in FIG. 3C is obtained. An OTDR waveform obtained in this manner is displayed by the display 15.

In the signal processor 14, for example, on the basis of a period of time from when an optical pulse is output from the light source 21 until the return light L0 is received by the optical receivers 24 and 25, for example, computation for obtaining a distance from the optical pulse tester 1 to a point of failure in the measurement target fiber FUT is performed. Computation results of the signal processor 14 (for example, a transmission loss in the measurement target fiber FUT, the distance to a point of failure, and the like) obtained in this manner are also displayed by the display 15.

As above, in the present embodiment, the return light L0 obtained from the measurement target fiber FUT is caused to divide into the divided light L1 and the divided light L2 by the optical divider 23, the divided light L1 is received by the optical receiver 24, and the divided light L2 is received by the optical receiver 25. Subsequently, level conversion of the optical receiver signals RS1 and RS2 respectively output from the optical receivers 24 and 25 is performed on the basis of the divided ratio of the optical divider 23 and the optical receiver sensitivities of the optical receivers 24 and 25. Further, a waveform indicating an intensity distribution of return light in the longitudinal direction of the measurement target fiber FUT is obtained by synthesizing the optical receiver signals RS1 and RS2 which have been subjected to level conversion.

Accordingly, the return light L0 obtained from the measurement target fiber FUT can be appropriately received even if the amplification degrees of the optical receivers 24 and 25 are not dynamically changed. As a result, it is possible to provide a high-performance optical pulse tester 1 in which deterioration in performance as in the related art is not caused when the amplification degree of the optical receiver is dynamically changed.

Specifically, in the optical pulse tester 1 of the present embodiment, deterioration in performance described in the foregoing (1) to (3) is not caused. For this reason, compared to optical pulse test devices in the related art, improvement in performance described in the following (1) to (3) can be obtained.

(1) Prompt Waveform Update (Real-Time Display)

In the present embodiment, a dynamic range can be further expanded than that in the related art by receiving the divided light L1 and the divided light L2 which have been caused to divide by the optical divider 23 using the optical receivers 24 and 25 at the same time. Accordingly, since there is no need to dynamically change the amplification degrees of the optical receivers 24 and 25 and a test of an optical fiber which has been required every time the amplification degree is changed becomes no longer necessary, prompt waveform update can be achieved.

(2) Improvement in Waveform Shift of Distance Axis

In the present embodiment, since there is no need to dynamically change the amplification degrees of the optical receivers 24 and 25, a difference between the circuit time constants of the optical receivers 24 and 25 can be minimized. Accordingly, a waveform shift of a distance axis (positional displacement of an OTDR waveform in the longitudinal direction of an optical fiber) can be improved (prevented).

(3) Improvement in Responsiveness of High Reflection Point (Dead Zone)

When a test of a high reflection point of the optical fiber is performed, even if the return light L0 having an excessively high optical intensity is obtained, the divided light L2 which has been caused to divide by the optical divider 23 in a small divided ratio is received by the optical receiver 25. Accordingly, output saturation of the amplifier provided in the optical receiver 25 does not occur, and the response speed is not reduced. As a result, reproducibility of an OTDR waveform in the vicinity of a high reflection point of an optical fiber can be improved.

Hereinabove, the optical pulse tester according to the embodiment of the present invention has been described, but the present invention is not limited to the foregoing embodiment and can be freely changed within the scope of the present invention. For example, the optical pulse tester according to the embodiment described above can perform measurement with either wavelength of two wavelengths, but it can perform measurement with any wavelength of three or more wavelengths.

In addition, the optical pulse tester 1 according to the embodiment described above has a constitution in which an optical pulse transmitted through the optical directional coupler 22 is caused to incident on the measurement target fiber FUT and return light from the measurement target fiber FUT is reflected by the optical directional coupler 22. However, it may adopt a constitution in which an optical pulse reflected by the optical directional coupler 22 is caused to incident on the measurement target fiber FUT and return light from the measurement target fiber FUT is transmitted through the optical directional coupler 22.

[Supplementary Note]

According to an aspect of the present invention, there is provided an optical pulse tester for testing characteristics of an optical fiber (FUT) on the basis of return light (L0) obtained by causing an optical pulse to be incident on the optical fiber, the optical pulse tester (1) may include an optical divider (23) configured to cause the return light to divide into first divided light (L1) and second divided light (L2), a first optical receiver (24) configured to receive the first divided light and output a first optical receiver signal (RS1), a second optical receiver (25) configured to receive the second divided light and output a second optical receiver signal (RS2), and a signal processor (14) configured to obtain a waveform indicating an intensity distribution of the return light in a longitudinal direction of the optical fiber by performing level conversion of the first optical receiver signal and the second optical receiver signal on the basis of a divided ratio of the optical divider and optical receiver sensitivities of the first optical receiver and the second optical receiver and synthesizing the first optical receiver signal and the second optical receiver signal which have been subjected to the level conversion.

In addition, in the optical pulse tester according to the aspect of the present invention, the optical divider is configured to cause the return light to divide into the first divided light and the second divided light in different divided ratios.

In addition, in the optical pulse tester according to the aspect of the present invention, the first optical receiver and the second optical receiver have different optical receiver sensitivities.

In addition, in the optical pulse tester according to the aspect of the present invention, the first optical receiver may include a first photodetector (24a) configured to receive the first divided light, and a first amplifier (24b) configured to amplify an optical receiver signal which has been output from the first photodetector, and configured to output the optical receiver signal as the first optical receiver signal. The second optical receiver may include a second photodetector (25a) configured to receive the second divided light, and a second amplifier (25b) configured to amplify an optical receiver signal which has been output from the second photodetector, and configured to output the optical receiver signal as the second optical receiver signal.

In addition, in the optical pulse tester according to the aspect of the present invention, the first photodetector and the second photodetector have different optical receiver characteristics.

In addition, in the optical pulse tester according to the aspect of the present invention, the first amplifier and the second amplifier have different amplification rates of an optical receiver signal.

In addition, the optical pulse tester according to the aspect of the present invention may further include a laser driver (11) configured to output a drive signal, a light source (21) configured to emit the optical pulse in accordance with the drive signal output from the laser driver, and an optical directional coupler (22) configured to couple the optical pulse emitted from the light source to one end of the optical fiber.

In addition, the optical pulse tester according to the aspect of the present invention may further include a first A/D converter (13a) configured to sample the first optical receiver signal output from the first amplifier, and a second A/D converter (13b) configured to sample the second optical receiver signal output from the second amplifier. The signal processor is configured to obtain the waveform indicating the intensity distribution of the return light by performing the level conversion of the first optical receiver signal sampled by the first A/D converter and the second optical receiver signal sampled by the second A/D converter on the basis of the divided ratio of the optical divider and the optical receiver sensitivities of the first optical receiver and the second optical receiver and synthesizing the first optical receiver signal and the second optical receiver signal which have been subjected to the level conversion.

In addition, the optical pulse tester according to the aspect of the present invention may further include a display (15) configured to display the waveform indicating the intensity distribution of the return light obtained by the signal processor. In addition, in the optical pulse tester according to the aspect of the present invention, the display is configured to display a transmission loss in the optical fiber and a distance to a point of failure in the optical fiber.

According to the present invention, there is an effect that it is possible to provide a high-performance optical pulse tester in which deterioration in performance as in the related art is not caused when an amplification degree of an optical receiver is dynamically changed.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An optical pulse tester for testing characteristics of an optical fiber on the basis of return light obtained by causing an optical pulse to be incident on the optical fiber, the optical pulse tester comprising:
    a first light source configured to emit a first optical pulse having a first wavelength;
    a second light source configured to emit a second optical pulse having a second wavelength different from the first wavelength;
    a multiplexing filter configured to multiplex the first optical pulse and the second optical pulse;
    an optical directional coupler configured to couple the first optical pulse and the second optical pulse multiplexed by the multiplexing filter to one end of the optical fiber;
    an optical divider configured to cause the return light from the optical fiber to divide into first divided light and second divided light;
    a first optical receiver configured to receive the first divided light and output a first optical receiver signal;
    a second optical receiver configured to receive the second divided light and output a second optical receiver signal; and
    a signal processor configured to store information representing a divided ratio of the optical divider and optical receiver sensitivities of the first optical receiver and the second optical receiver, and configured to obtain a waveform indicating an intensity distribution of the return light in a longitudinal direction of the optical fiber by performing level conversion of the first optical receiver signal and the second optical receiver signal on the basis of the information and synthesizing the first optical receiver signal and the second optical receiver signal which have been subjected to the level conversion.

2. The optical pulse tester according to claim 1,
    wherein the optical divider is configured to cause the return light to divide into the first divided light and the second divided light in different divided ratios.

3. The optical pulse tester according to claim 1,
    wherein the first optical receiver and the second optical receiver have different optical receiver sensitivities.

4. The optical pulse tester according to claim 1, further comprising:
    a laser driver configured to output a drive signal to the first light source and the second light source,
    wherein the first light source is configured to emit the first optical pulse in accordance with the drive signal output from the laser driver, and
    wherein the second light source is configured to emit the second optical pulse in accordance with the drive signal output from the laser driver.

5. The optical pulse tester according to claim 1, further comprising:
    a display configured to display the waveform indicating the intensity distribution of the return light obtained by the signal processor.

6. The optical pulse tester according to claim 5,
    wherein the display is configured to display a transmission loss in the optical fiber and a distance to a point of failure in the optical fiber.

7. The optical pulse tester according to claim 1,
    wherein the first optical receiver comprises:
        a first photodetector configured to receive the first divided light; and
        a first amplifier configured to amplify an optical receiver signal which has been output from the first photodetector, and configured to output the optical receiver signal as the first optical receiver signal, and
    wherein the second optical receiver comprises:
        a second photodetector configured to receive the second divided light; and
        a second amplifier configured to amplify an optical receiver signal which has been output from the second photodetector, and configured to output the optical receiver signal as the second optical receiver signal.

8. The optical pulse tester according to claim 7,
    wherein the first photodetector and the second photodetector have different optical receiver characteristics.

9. The optical pulse tester according to claim 7,
    wherein the first amplifier and the second amplifier have different amplification rates of an optical receiver signal.

10. The optical pulse tester according to claim 7, further comprising:
    a first A/D converter configured to sample the first optical receiver signal output from the first amplifier; and
    a second A/D converter configured to sample the second optical receiver signal output from the second amplifier,
    wherein the signal processor is configured to obtain the waveform indicating the intensity distribution of the return light by performing the level conversion of the first optical receiver signal sampled by the first A/D converter and the second optical receiver signal sampled by the second A/D converter on the basis of the divided ratio of the optical divider and the optical receiver sensitivities of the first optical receiver and the second optical receiver and synthesizing the first optical receiver signal and the second optical receiver signal which have been subjected to the level conversion.

* * * * *